(No Model.)
G. W. RAWSON & G. E. WORTHEN.
HOISTING APPARATUS.
No. 337,866. Patented Mar. 16, 1886.
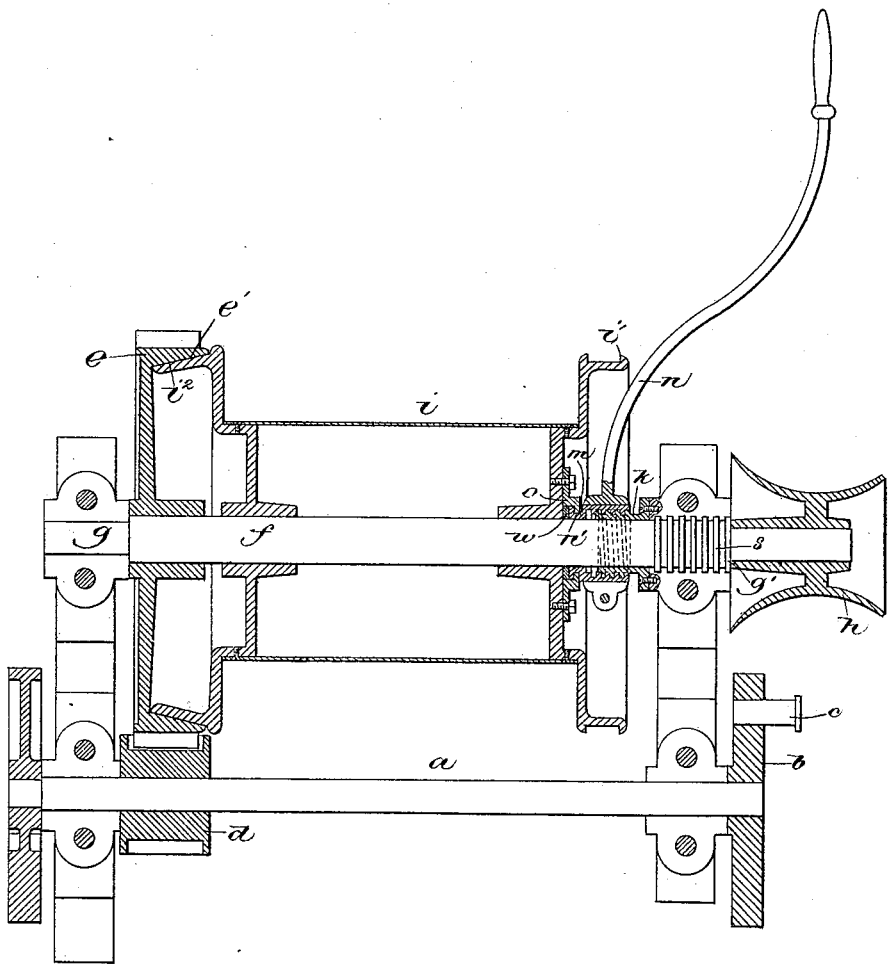
Witnesses
Fred L. Emery.
John F. C. Printkirk
Inventors,
George W. Rawson
George E. Worthen
By Crosby & Gregory Attys

UNITED STATES PATENT OFFICE.

GEORGE W. RAWSON AND GEORGE E. WORTHEN, OF CAMBRIDGE, MASS.

HOISTING APPARATUS.

SPECIFICATION forming part of Letters Patent No. 337,866, dated March 16, 1886.

Application filed December 7, 1885. Serial No. 184,927. (No model.)

*To all whom it may concern:*

Be it known that we, GEORGE W. RAWSON and GEORGE E. WORTHEN, of Cambridge, county of Middlesex, State of Massachusetts, have invented an Improvement in Hoisting Apparatus, of which the following description, in connection with the accompanying drawings, is a specification.

Our invention is intended as an improvement in hoisting-engines of the class shown in Letters Patent No. 158,967, dated June 19, 1875, the apparatus comprising a positively actuating friction-cone composing one member of a friction-clutch, and a winding-drum having a co-operating friction-cone composing the other member of the said clutch, which may be engaged with or disengaged from the actuated member in order to rotate the said drum positively or leave it free to turn under the strain on the rope, as may be desired. The winding-drum, as shown in the said patent, is moved longitudinally on the shaft to control the friction of the cones or to operate the clutch by a screw at the end of the shaft, having a stem running into the shaft and engaging the drum, the said screw moving the drum positively in the direction to engage the clutch, while the drum is moved in the other direction to disengage the clutch by a spring.

The present invention consists, essentially, in a novel construction of the clutch-operating device, consisting, essentially, of a screw surrounding the shaft, which is free at its end and may be provided with a winch-head for assisting in the hoisting operation, the clutch-operating device by a shifting mechanism being operated positively both in engaging and disengaging the clutch.

The drawing shows mainly in horizontal section a sufficient portion of a hoisting apparatus to illustrate this invention.

The main driving-shaft $a$, provided with a wrist-plate, $b$, and crank-pin $c$, to be actuated by a steam-engine or any suitable motor, has fixed upon it a pinion, $d$, meshing with and positively actuating a gear, $e$, all substantially as in the patent referred to. The said gear $e$ is mounted upon a shaft, $f$, turning in suitable bearings $g$ and $g'$ on the frame-work, and provided with a winch-head, $h$, connected with the said shaft at the outside of the bearing $g'$ and frame-work of the apparatus.

The gear $e$ has a conical frictional surface, $e'$, constituting one member of a friction-clutch, and the shaft $f$ has mounted loosely upon it a winding-drum, $i$, which, when rotated in unison with the said shaft and gear $e$, causes a rope to be wound thereon, or, when permitted to turn freely on the said shaft, will allow the rope to unwind by the action of the weight connected with it, the said drum being preferably provided with a suitable friction-collar, $i'$, for the application of a brake of usual construction for controlling its movements while turning independently of the shaft $f$ and gear $e$.

The winding-drum $i$ is provided at one end with a conical frictional surface, $i^2$, corresponding with the surface $e'$ of the gear $e$, and constituting the other member of the friction-clutch, so that when the said drum is forced longitudinally toward the said gear $e$ the two surfaces $e'$ $i^2$ will engage one another frictionally, causing the drum to turn with the gear $e$ in the proper direction to wind the rope thereon.

The drum $i$ is positively moved longitudinally in either direction to engage or disengage the frictional surfaces of the clutches $e'$ $i^2$ by shifting mechanism, consisting of a hub, $h$, surrounding the shaft $f$ and bolted to the frame-work, said hub being provided with a stout screw-thread, upon which is fitted a co-operating threaded collar or nut, $m$, having a handle-lever, $n$, by which it may be turned to move it longitudinally by reason of the engaging threads.

The nut $m$ has a grooved projection, $n'$, engaged by a collar, $o$, bolted to the end of the bearing portion or hub of the drum $i$, so that the said drum is caused to accompany the nut in its longitudinal movement produced by the handle $n$.

The bearing portion of the shaft $f$ is scored, as at $s$, which turns in a box scored to correspond with the bearing portion of the shaft $f$, to thus take up the lateral thrust.

Interposed between the grooved end of the nut $m$ and the end of the drum $i$ is a steel washer, $u$, to reduce the friction and compensate for wear. By this device the drum may be moved longitudinally with great power by the lever *n* to engage or disengage the clutch, as may be desired, the shifting device being stronger, more durable, and more convenient than those before in use, besides admitting of the shaft *f* extending through it to actuate the winch-head *h*, which cannot be done when the clutch is operated from the end of the shaft, as in the patent referred to.

It is obvious that the shaft *a* may be omitted and the shaft *f* actuated directly by the motor, in which case the friction-clutch will be devoid of teeth.

We claim—

1. The positively-actuated clutch member having a friction-surface and the co operating member having a corresponding friction-surface, combined with the shaft supporting the said clutch members, and the clutch actuating or shifting device, consisting of a stationary threaded hub surrounding the said shaft, and the nut on the said hub connected with the clutch member, as set forth, whereby the clutch is positively engaged or disengaged, substantially as described.

2. The actuated clutch member having a friction-surface, and the shaft connected with the said member provided with a winch-head, combined with the clutch member loose on the said shaft and the clutch operating or shifting device surrounding the shaft between the winch-head and movable clutch member, substantially as described.

3. The actuated clutch member and shaft upon which it is fixed, the clutch member loose upon said shaft, combined with a shifting device consisting of the stationary threaded hub surrounding the shaft, a nut fitted to turn on said hub and having a grooved end portion, a collar connected with the loose clutch member and engaging the grooved end portion of the nut, and the lever to rotate the nut, all substantially as described.

4. The actuated clutch members, the loose clutch member combined with a shaft, *f*, having a scored end portion, *s*, said shaft having the clutch members, respectively, rigidly and loosely connected therewith, substantially as described.

In testimony whereof we have signed our names to this specification in the presence of two subscribing witnesses.

GEO. W. RAWSON.
    GEO. E. WORTHEN.

Witnesses:
 B. J. NOYES,
 C. M. CONE.